(12) United States Patent
Scalabrino et al.

(10) Patent No.: US 10,042,640 B2
(45) Date of Patent: Aug. 7, 2018

(54) PROCESSING QUEUE MANAGEMENT

(71) Applicant: ARM LIMITED, Cambridge (GB)

(72) Inventors: Luca Scalabrino, Villeneuve Loubet (FR); Frederic Jean Denis Arsanto, Le Rouret (FR); Thomas Gilles Tarridec, Juan-les-Pins (FR); Cedric Denis Robert Airaud, Saint Laurent du Var (FR)

(73) Assignee: ARM Limited, Cambridge (GB)

( * ) Notice: Subject to any disclaimer, the term of this patent is extended or adjusted under 35 U.S.C. 154(b) by 97 days.

(21) Appl. No.: 15/076,889

(22) Filed: Mar. 22, 2016

(65) Prior Publication Data
US 2016/0335085 A1    Nov. 17, 2016

(30) Foreign Application Priority Data

May 13, 2015    (GB) .................................. 1508132.6

(51) Int. Cl.
| | | |
|---|---|---|
| *G06F 9/30* | (2018.01) | |
| *G06F 9/312* | (2018.01) | |
| *G06F 9/38* | (2018.01) | |
| *G06F 9/52* | (2006.01) | |
| *G06F 8/41* | (2018.01) | |

(52) U.S. Cl.
CPC ........ *G06F 9/30087* (2013.01); *G06F 9/3836* (2013.01); *G06F 9/3851* (2013.01); *G06F 8/458* (2013.01); *G06F 9/3814* (2013.01); *G06F 9/3855* (2013.01); *G06F 9/3877* (2013.01); *G06F 9/522* (2013.01)

(58) Field of Classification Search
CPC .. G06F 9/30087; G06F 9/3814; G06F 9/3836; G06F 9/3851; G06F 9/3855; G06F 9/3877; G06F 9/522; G06F 8/458
USPC ........................................... 712/31, 205–219
See application file for complete search history.

(56) References Cited

U.S. PATENT DOCUMENTS

| | | | |
|---|---|---|---|
| 5,990,913 A | 11/1999 | Harriman et al. | |
| 6,209,073 B1* | 3/2001 | Okpisz | G06F 9/3004 711/167 |
| 6,651,163 B1 | 11/2003 | Kranich et al. | |
| 7,284,118 B2* | 10/2007 | Hacking | G06F 9/30087 711/141 |
| 8,447,911 B2* | 5/2013 | Burger | G06F 9/3824 711/5 |

(Continued)

OTHER PUBLICATIONS

Search and Examination Report for GB1508132.6 dated Nov. 13, 2015, 7 pages.

*Primary Examiner* — Daniel H Pan
(74) *Attorney, Agent, or Firm* — Nixon & Vanderhye P.C.

(57) ABSTRACT

A data processing system 2 includes multiple out-of-order issue queues 8, 10. A master serialization instruction MSI received by a first issue queue 8 is detected by slave generation circuitry 24 which generates a slave serialization instruction SSI added to a second issue queue 10. The master serialization instruction MSI manages serialization relative to the instructions within the first issue queue 8. The slave serialization instruction SSI manages serialization relative to the instructions within the second issue queue 10. The master serialization instruction MSI and the slave serialization instruction SSI are removed when both have met their serialization conditions and are respectively the oldest instructions within their issue queues.

10 Claims, 6 Drawing Sheets

(56) References Cited

U.S. PATENT DOCUMENTS

2005/0273583 A1* 12/2005 Caprioli ............... G06F 9/3004
                                                        712/245
2013/0046956 A1    2/2013 Tran et al.
2013/0046957 A1*   2/2013 Tran .................. G06F 9/30087
                                                        712/208

* cited by examiner

PROCESSING QUEUE MANAGEMENT

This application claims priority to GB Patent Application No. 1508132.6 filed May 13, 2015, the entire content of which is hereby incorporated by reference.

BACKGROUND

Field

This disclosure relates to the field of data processing systems. More particularly, this disclosure relates to the management of queues of processing operations within data processing systems.

Description

It is known to provide data processing systems employing queues of processing operations to be performed. An example of such a queue is an issue queue of instructions awaiting issue within an issue stage of an out-of-order processing apparatus.

SUMMARY

Viewed from one aspect the present disclosure provides an apparatus for processing data comprising:
first processing circuitry to manage a first queue of processing operations;
second processing circuitry to manage a second queue of processing operations;
slave generation circuitry to generate a slave processing operation within said second queue in response to adding of a master processing operation to said first queue; and
dependency control circuitry to control at least one of:
processing of said slave processing operation by said second processing circuitry in dependence upon a master status of said master processing operation; and
processing of said master processing operation by said first processing circuitry in dependence upon a slave status of said slave processing operation.

Viewed from another aspect the present disclosure provides apparatus for processing data comprising:
first processing means for managing a first queue of processing operations;
second processing means for managing a second queue of processing operations;
slave generation means for generating a slave processing operation within said second queue in response to adding of a master processing operation to said first queue; and
dependency control means for controlling at least one of:
processing of said slave processing operation by said second processing means in dependence upon a master status of said master processing operation; and
processing of said master processing operation by said first processing means in dependence upon a slave status of said slave processing operation.

Viewed from a further aspect the present disclosure provides a method of processing data comprising the steps of
managing with first processing circuitry a first queue of processing operations;
managing with second processing circuitry a second queue of processing operations;
generating a slave processing operation within said second queue in response to adding of a master processing operation to said first queue; and
controlling at least one of:
processing of said slave processing operation by said second processing circuitry in dependence upon a master status of said master processing operation; and
processing of said master processing operation by said first processing means in dependence upon a slave status of said slave processing operation.

The above, and other objects, features and advantages of this disclosure will be apparent from the following detailed description of illustrative embodiments which is to be read in connection with the accompanying drawings.

DRAWINGS

FIG. 1 schematically illustrates a processor having multiple out-of-order program instruction issue queues;

FIG. 2 schematically illustrates how a master serialisation instruction received at one issue queue generates a slave serialisation instruction in another issue queue;

EMBODIMENTS

Figure 1:
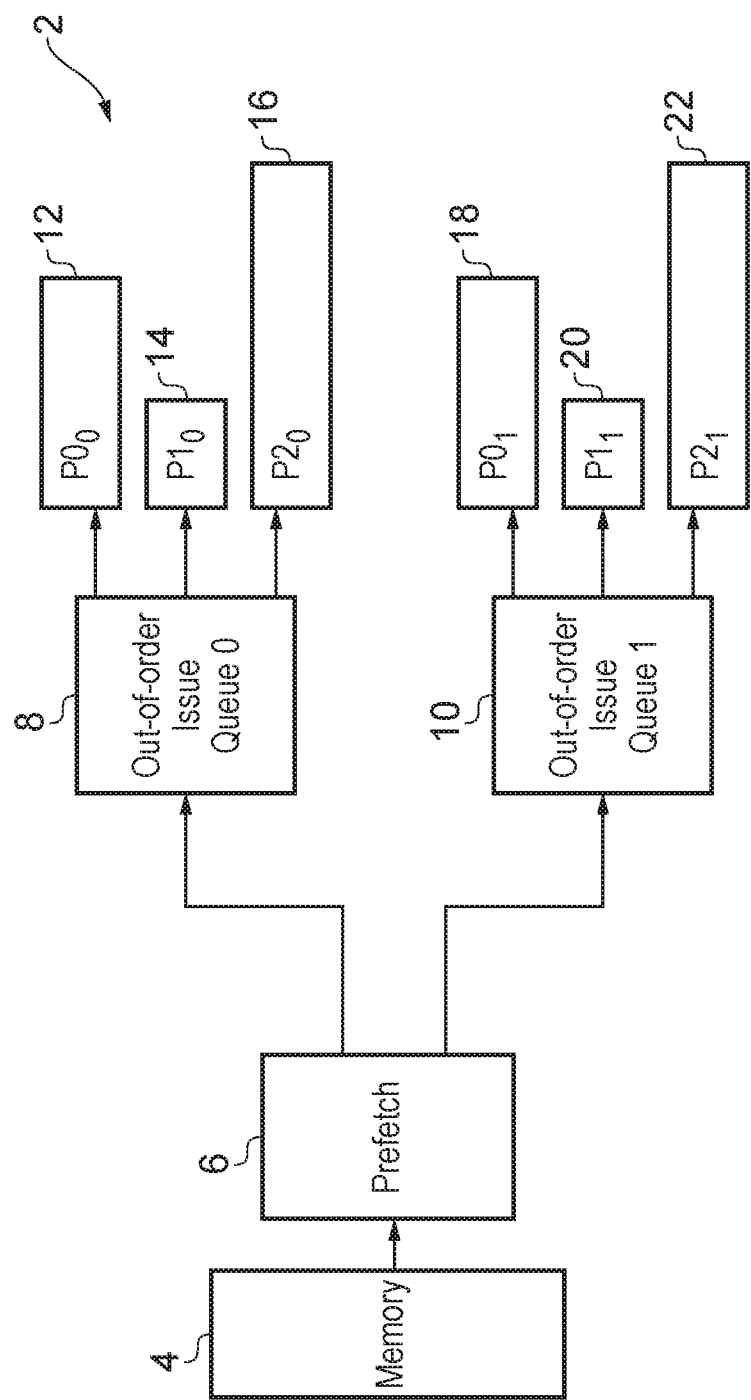

FIG. 1 schematically illustrates a data processing apparatus 2 in the form of a programmable processor for performing out-of-order execution of program instructions. Program instructions are fetched from a memory 4 by a prefetch unit 6. The program instructions are then sent in program flow order to a respective one of a first out-of-order issue queue 8 and a second out-of-order issue queue 10. These out-of-order issue queues 8, 10 are examples of first processing circuitry to manage a first queue of processing operations and second processing circuitry to manage a second queue of processing operations.

As will be familiar to those in this technical field, the issue queues 8, 10 serve to control the out-of-order issue of program instructions for execution into respective processing pipelines 12, 14, 16, 18, 20, 22 in accordance with factors such as the availability of source operands, the availability of the appropriate processing pipeline 12, 14, 16, 18, 20, 22 required to perform execution of the program instruction, etc.

Figure 2:
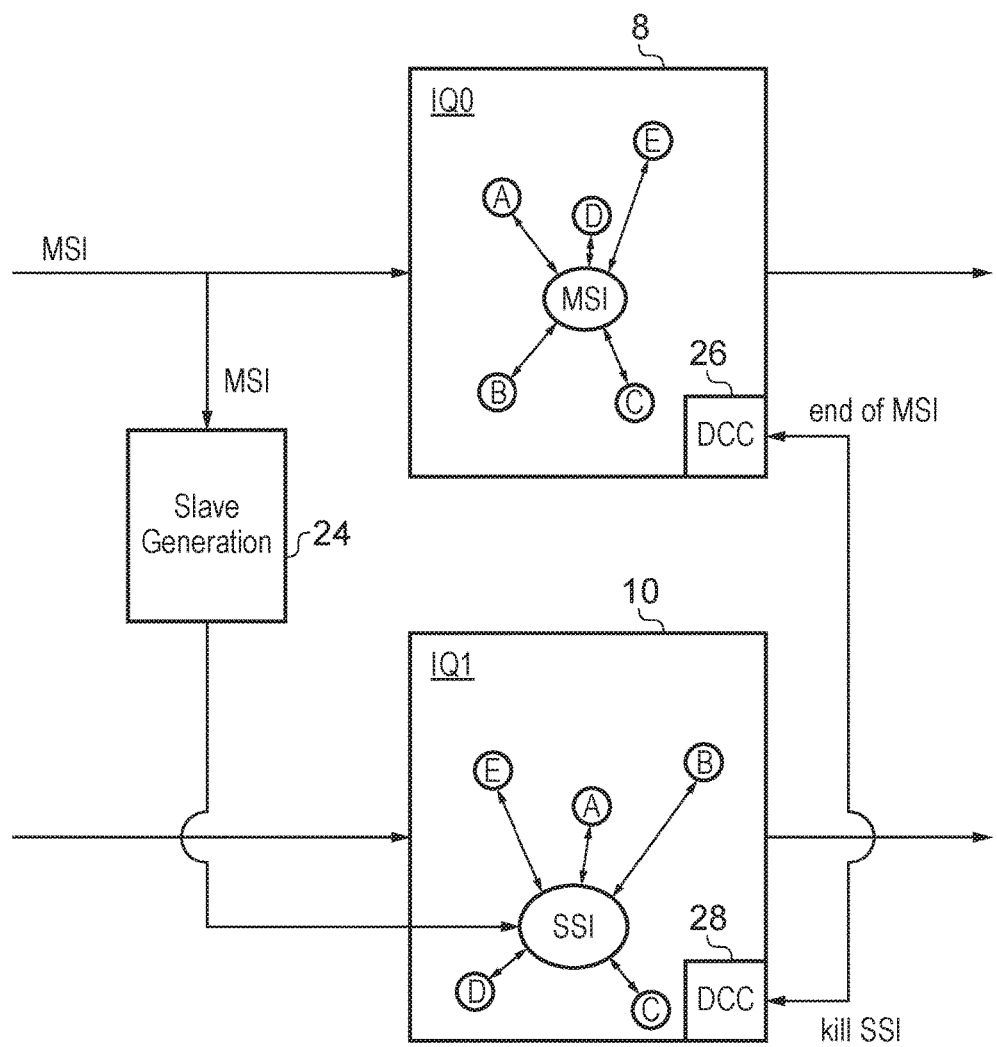

FIG. 2 schematically illustrates the first issue queue 8 and the second issue queue 10 processing serialisation instructions. It is known within data processing systems to provide a serialisation instruction within the source program. Such serialisation instructions may, for example, indicate that during out-of-order execution a degree of ordering must be enforced such that all of the instructions preceding the serialisation instruction within the program flow should have completed before any program instructions following the serialisation instruction are performed. It will be appreciated that the requirements concerning ordering imposed by a serialisation instruction may vary between different program instruction sets, processor architectures and implementations of processors targeting given program instruction sets. The present techniques are not limited to the particular constraints associated with an individual form of serialisation instruction.

In the example embodiment illustrated in FIG. 2, a master serialisation instruction MSI, which is present within a program fetched from the memory 4, is sent by the prefetch unit 6 to the first issue queue 8. The first issue queue 8, in this example embodiment, is designated as the issue queue which will handle all serialisation instructions from within the program flow fetched from the memory 4 and will treat these as master serialisation instructions (master processing operations). As will be familiar to those in this technical field, the first issue queue 8 serves to manage the issue of other program instructions A, B, C, D, E stored within a first queue managed by the first issue queue 8. The first issue queue 8 records the order in which program instructions are added to the first queue and thereby stores the relative ages of those program instructions as they are received following the ordering of instructions within the program flow of the program read from the memory 4. The action of the master serialisation instruction MSI is to exclude from issue those program instructions within the first issue which were added to the first queue after the master serialisation instruction MSI was added to the first queue. Once the master serialisation instruction MSI has been removed (issued) from the first queue, then the subsequent older program instructions stored within the first queue may be issued.

As illustrated in FIG. 2, slave generation circuitry 24 snoops the program instructions being added to the first queue and in particular detects when a master serialisation instruction MSI is added to the first queue held within the first issue queue 8. When the slave generation circuitry 24 detects that a master serialisation instruction MSI has been added to the first queue 8, it triggers generation of a slave serialisation instruction SSI which is added to the second queue within the second issue queue 10. This slave serialisation instruction SSI is handled by the second issue queue 10 in a similar manner to that in which the master serialisation instruction (MSI) is handled by the first issue queue 8. More particularly, the presence of the slave serialisation instruction SSI within the second issue queue 10 serves to exclude from issue by the second issue queue 10 any program instructions stored within the second queue which were added to that second queue after the slave serialisation instruction SSI was added to the second queue. The similarity in behaviour of the first issue queue 8 and the second issue queue 10 simplifies the design and testing of these circuit elements as similar circuits can be used for both.

The first issue queue 8 includes first dependency control circuitry 26 and the second issue queue 10 includes second dependency control circuitry 28. The first dependency control circuitry 26 serves to control processing of the master serialisation instruction MSI by the first issue queue 8 in dependence on the reported status of the slave serialisation instruction SSI within the second issue queue 10. More particularly, the first dependency control circuitry controls processing of the master serialisation instruction such that the master serialisation instruction is removed from the first queue (issued with any associated writing of status etc.), in dependence upon detection by the first issue queue 8 that the master serialisation instruction MSI is the oldest instruction held within the first queue (i.e. all earlier program instructions have now been issued), and that the second issue queue 10 indicates using the second dependency control circuitry 28 that the slave serialisation instruction SSI is the oldest instruction currently present within the second queue. When both these conditions are met, the master serialisation instruction MSI can be removed, as the serialisation requirement it specified has been met. When the master serialisation instruction SSI is removed, then this can be notified by the first dependency control circuitry 26 to the second dependency control circuitry 28 in order to trigger the second dependency control circuitry 28 to remove the slave serialisation instruction SSI from the second queue. The action of the master serialisation instruction MSI is that it manages serialisation within those program instruction received into the first queue. The slave serialisation instruction SSI manages serialisation within instructions received into the second queue. It is not necessary for the first issue queue 8 to track instructions within the second queue and it is not necessary for the second issue queue 10 to track instructions within the first queue. This simplifies implementation. The dependency control circuitry 26, 28 serves to coordinate the action of the master serialisation instruction MSI and the slave serialisation instruction SSI to ensure that both have fulfilled their serialisation requirements before either is able to be removed from their respective queue.

Figure 3:
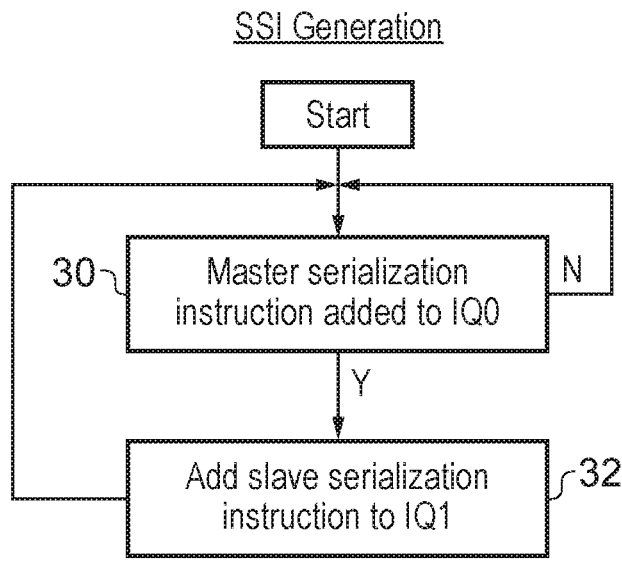
FIG. 3 is a flow diagram schematically illustrating slave serialisation instruction generation.

FIG. 3 schematically illustrates slave serialisation instruction generation. At step 30 the slave generation circuitry 24 monitors the instructions being added to the first queue within the first instruction queue 8 to detect if any master serialisation instructions MSI are being added to the first queue. When such a master serialisation instruction MSI is detected as being added to the first queue, processing proceeds to step 32 where a slave serialisation instruction SSI is added to the second queue held by the second issue queue 10.

Figure 4:
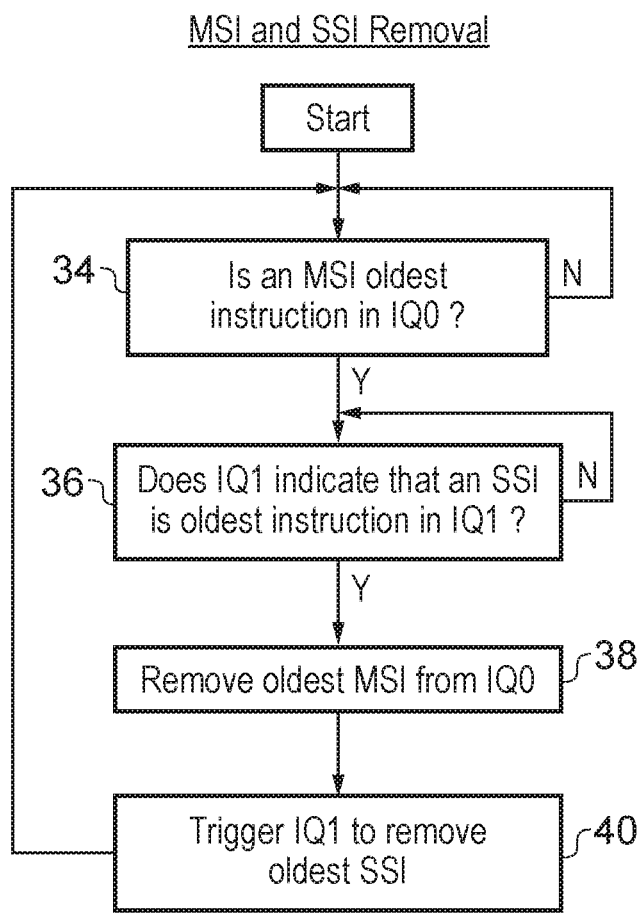
FIG. 4 is a flow diagram schematically illustrating master serialisation instruction and slave serialisation instruction removal.

FIG. 4 is a flow diagram schematically illustrating the control of a master serialisation instruction MSI and slave serialisation instruction SSI removal by the first dependency control circuitry 26 and the second dependency control circuitry 28. At step 34 a determination is made as to whether or not the master serialisation instruction MSI is the oldest instruction held within the first queue. When the master serialisation instruction MSI is the oldest instruction held within the first queue, then processing proceeds to step 36 where a determination is made as to whether the second dependency control circuitry 28 indicates that the slave serialisation instruction SSI is the oldest instruction held within the second queue. When the second dependency control circuitry 28 makes this indication, then processing proceeds to step 38 whereby the master serialisation instruction MSI is removed (issued) from the first issue queue 8. At step 40 the first dependency control circuitry 26 sends a signal to the second dependency control circuitry 28 to trigger the second dependency control circuitry 28 to permit the slave serialisation instruction SSI to be removed from the second queue.

Figure 5:
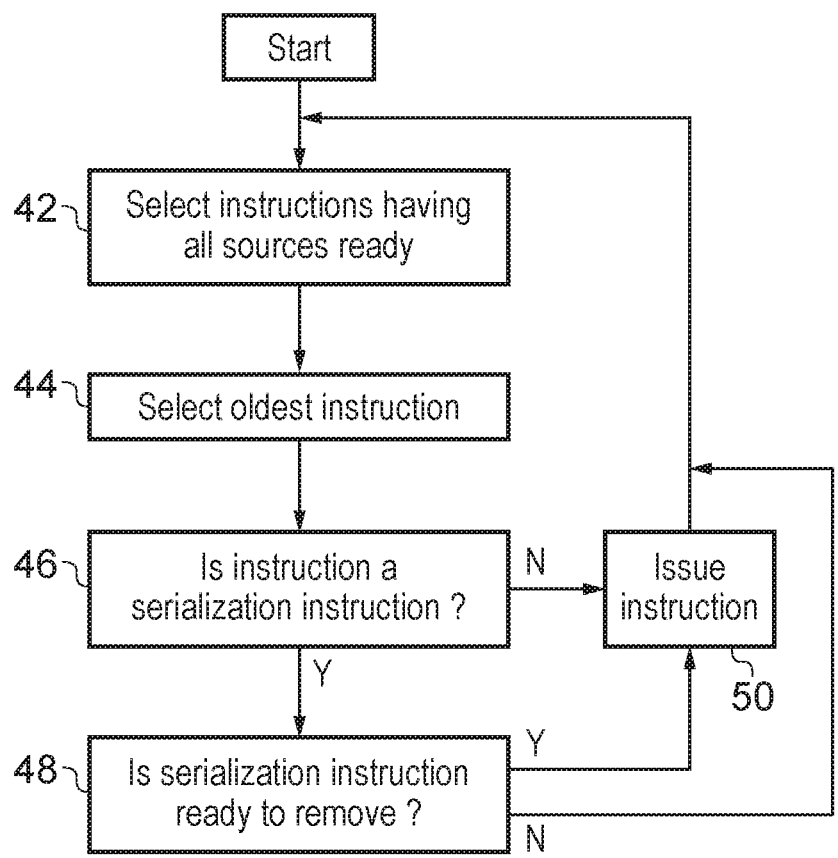
FIG. 5 is a flow diagram schematically illustrating instruction issue control.

FIG. 5 is a flow diagram schematically illustrating instruction issue control as performed by both the first issue queue 8 or the second issue queue 10. At step 42 a selection is made of those instructions held within the queue which have all their sources available and accordingly are ready for issue. Instructions not meeting this requirement are excluded from serving as candidate instructions for issue. Step 44 selects the oldest instruction which has been identified by step 42 as a candidate for issue. Step 46 determines whether the oldest instruction which has been selected is a serialisation instruction. If the oldest instruction is a serialisation instruction, then step 48 determines whether that serialisation instruction is ready to be removed from the queue. As previously described, the serialisation instruction may be ready to remove from the queue when it is the oldest instruction within that queue and any master serialisation instruction or slave serialisation instruction with which it is associated also is the oldest instruction within its respective queue. If the serialisation instruction is ready to be removed, or if the oldest instruction identified at step 44 is not a serialisation instruction, then processing proceeds to step 50 where the selected instruction is issued into the appropriate one of the processing pipelines 12, 14, 16, 18, 20, 22, or simply removed with an appropriate status writeback in the case of a serialisation instruction. If the determination at step 46 is that the oldest instruction selected at step 44 is not a serialisation instruction, then processing proceeds directly to step 50 at which that selected oldest instruction is issued.

Figure 6:
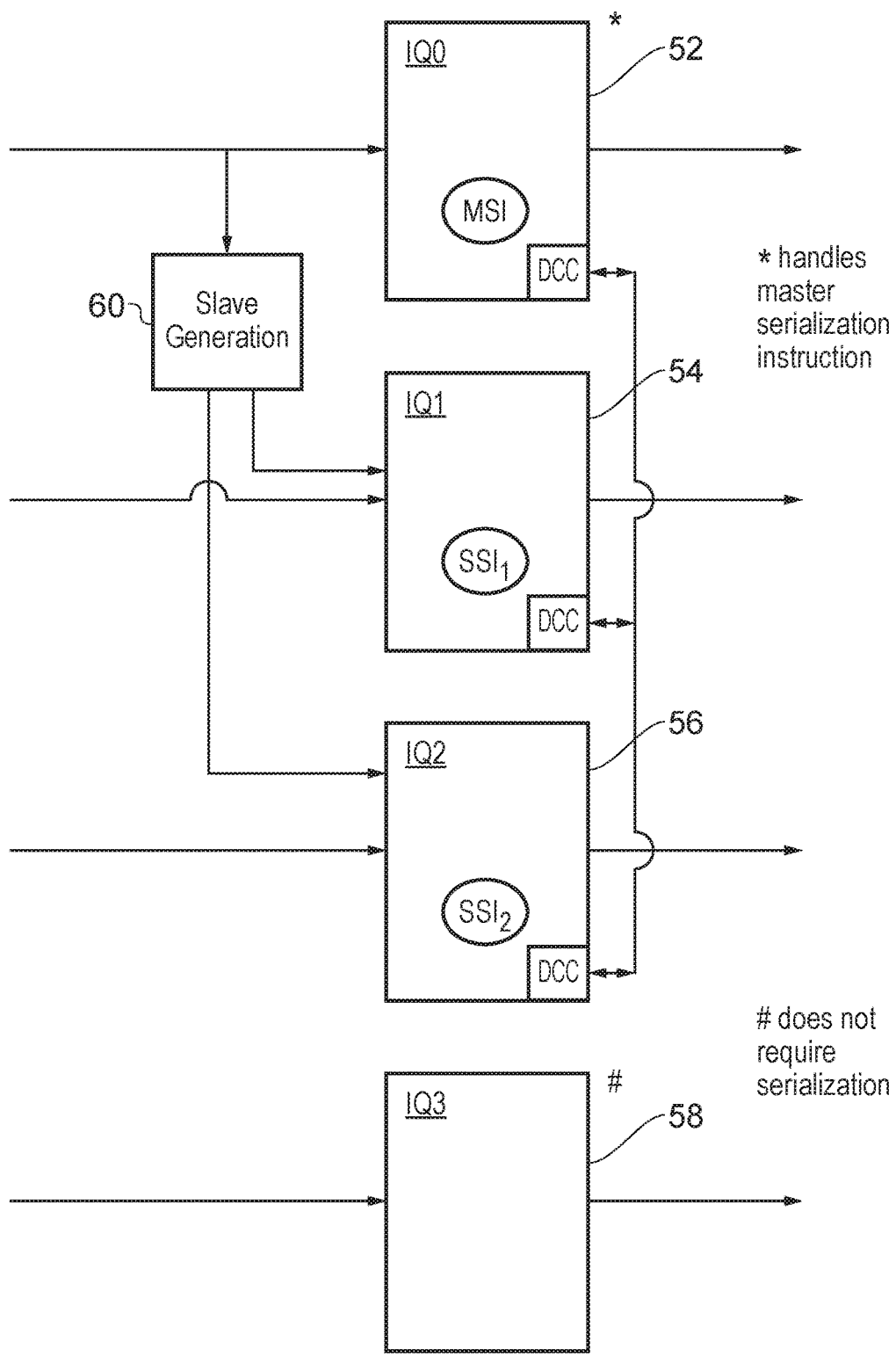
FIG. 6 is a diagram schematically illustrating a further example embodiment including multiple instruction queues between which serialisation is managed and an instruction queue which does not require serialisation.

FIG. 6 illustrates a further example embodiment. This further example embodiment includes a first issue queue 52, a second issue queue 54, a third issue queue 56 and a fourth issue queue 58. The first issue queue 52 is designated to handle any received master serialisation instructions within the program flow. If such a master serialisation instruction is received, then slave generation circuitry 60 serves to add slave serialisation instructions $SSI_1$, $SSI_2$ respectively to the second instruction queue 54 and the third instruction queue 56. Serialisation is then managed within the group of instruction queues comprising the first instruction queue 52, the second instruction queue 54 and the third instruction queue 56. In this example embodiment, the fourth instruction queue 58 does not require serialisation. This may be, for example, because the fourth instruction queue 58 is dedicated to receive a particular type of program instruction which is not sensitive to serialisation and accordingly does not need to have its execution managed relative to the position of the master serialisation instruction within the program flow. Other embodiments may not pre-designate a particular instruction queue to handle master serialisation instructions with these instead being handled by one of several possible instruction queues.

Figure 7:
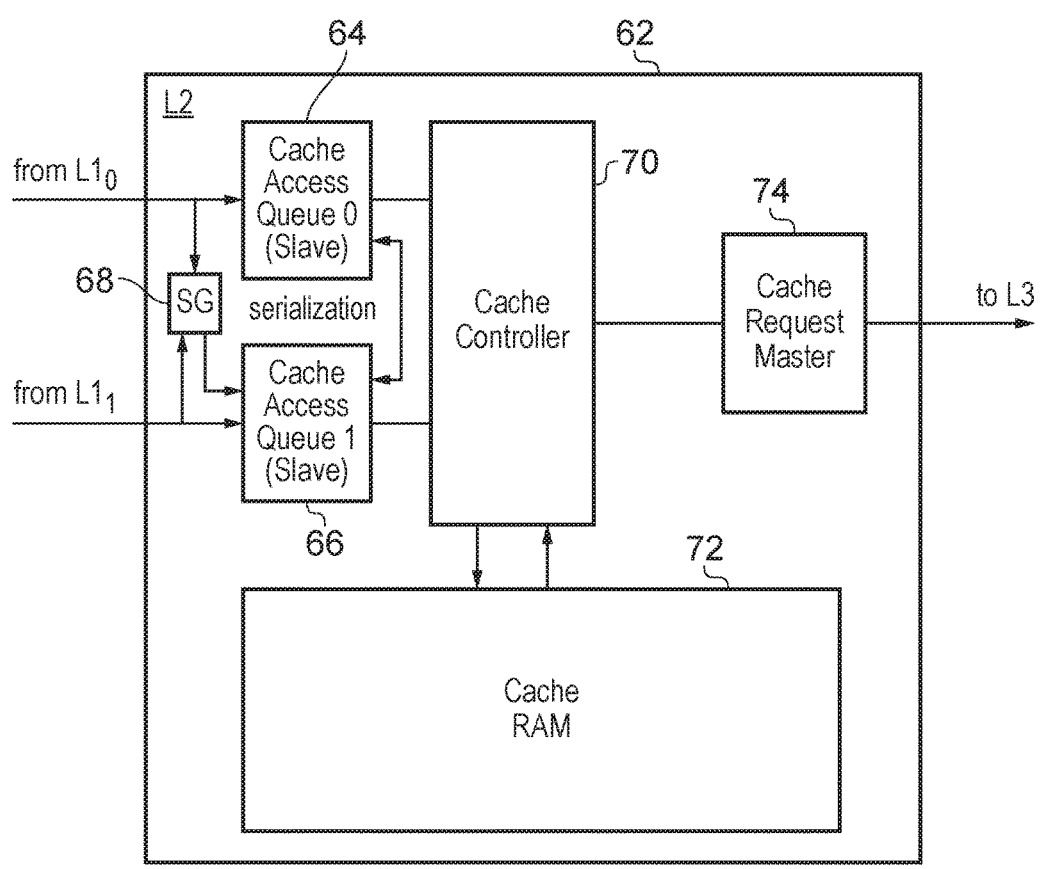
FIG. 7 schematically illustrates a further example embodiment in which queues of cache access operations are from respective level 1 caches are maintained within a level 2 cache.

The above described embodiments have involved first processing circuitry for managing a first queue and second processing circuitry for managing a second queue in the form of instruction issue queues within out-of-order processors. The present techniques may be employed in other circumstances. FIG. 7 schematically illustrates another example embodiment of the present techniques. This example embodiment is a level 2 cache 62 which receives cache access requests from multiple level 1 caches into respective cache access queues 64, 66. These cache access queues 64, 66 can receive master processing operations in the form of cache access requests with ordering requirements relative to other cache accessing requests. Slave generation circuitry 68 serves to detect such master processing operations added to either of the cache access queues 64, 66 and triggers generation of an associated slave processing operation within the other of the cache access queues 64, 66. The relative ordering of the processing of cache access requests within the cache access queue 64, 66 is managed in dependence upon their respective contained master and slave processing operations. A slave cache access request is processed in dependence upon the status of an associated master cache access request. A master cache access request is processed in dependence upon the status of an associated slave cache access request. This may, for example, enforce a desired ordering between cache access requests. A cache controller 70 receives cache access requests from the cache access queues 64, 66 and services them with data held within the level 2 cache RAM 72 if possible. If there is a miss within the level 2 cache RAM 72, then a cache request master 74 issues an appropriate cache access request onward to a level 3 cache.

As discussed above, the first processing circuitry for managing a first queue and the second processing circuitry for managing a second queue can take a variety of different forms. Dependency control circuitry serves to control the processing of a slave processing operation in dependence upon the status of a master processing operation and/or control processing of a master processing operation in dependence upon the status of a slave processing operation. One form of the first processing circuitry and the second processing circuitry is that of out-of-order instruction issue circuitry within out-of-order processors. Other forms of first processing circuitry and second processing circuitry are also possible, such as the cache access queues 64, 66 illustrated in FIG. 7.

In the case of instruction queues, the program instructions may be added to these instruction queues in an order following the program flow order. The program instructions are issued out of the instruction queue in an order which may or may not follow the program flow order and is dependent upon, for example, the availability of sources for the instructions and/or processing resources necessary to process those instructions.

When the master processing operation and the slave processing operation take the form of serialisation instructions, they can serve to control issue of program instructions such that an ordering is enforced with program instructions preceding the serialisation instruction within the program flow reaching a certain first point in their processing before program instructions following the serialisation instruction are allowed to proceed past a certain second point in their processing. Other forms of master processing operation and slave processing operation are possible in addition to serialisation instruction.

The dependency control circuitry 26, 28 within an individual issue queue 8, 10 may respond to a serialisation instruction within that issue queue to monitor and enforce serialisation relative to the other program instructions within that issue queue. The enforcement of serialisation relative to other program instructions held within other issue queues is delegated to those other issue queues, which have their own serialisation instructions within them consequent to the action of the slave generation circuitry 24. Issue queues can then notify each other when their serialisation conditions have been met such that an individual serialisation instruction within a given queue will not be removed until it has met its own serialisation requirements relative to the instructions within its own queue and it has been notified that all other serialisation instructions within the systems corresponding to its own serialisation instruction have also met their serialisation requirements. As the age of instructions entering the queues may be tracked, the coordination between different serialisation instructions, such that associated master and slave serialisation instructions are matched together when their requirements are being judged, may be readily achieved. If multiple serialisation instructions are present within a queue, then these will have different ages and so will not be reordered relative to each other. Thus, the serialisation instructions will be added in order to each queue and then removed in that same order from each queue.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
   first processing circuitry to manage a first queue of processing operations;
   second processing circuitry to manage a second queue of processing operations;
   slave generation circuitry to generate a slave processing operation within said second queue in response to adding of a master processing operation to said first queue; and
   dependency control circuitry to control at least one of:
      processing of said slave processing operation by said second processing circuitry in dependence upon a master status of said master processing operation; and
      processing of said master processing operation by said first processing circuitry in dependence upon a slave status of said slave processing operation
   wherein:
   said first processing circuitry is first out-of-order instruction issue circuitry to manage out-of-order issue of program instructions within a first instruction queue and said second processing circuitry is second out-of-order instruction issue circuitry to manage out-of-order issue of program instructions within a second instruction queue;
   program instructions are stored into said first out-of-order instruction issue circuitry and said second out-of-order instruction issue circuitry following instruction order within a stream of said program instructions;
   said master processing operation is a master serialization instruction added to said first queue from said stream of program instructions; and
   said first out-of-order issue circuitry is responsive to presence of said master serialization instruction within said first queue to manage said first queue so that program instructions within said first queue added to said first queue after said master serialization instruction was added to said first queue are excluded from issue.

2. Apparatus as claimed in claim 1, wherein said first processing circuitry manages a first relative execution commencement order of processing operations within said first queue and said second processing circuitry manages a second relative execution commencement order of processing operations within said second queue.

3. Apparatus as claimed in claim 1, wherein said slave processing operation is a slave serialization instruction added to said second queue by said slave generation circuitry.

4. Apparatus as claimed in claim 1, wherein said second out-of-order issue circuitry is responsive to presence of said slave serialization instruction within said second queue to manage said second queue so that program instructions within said second queue added to said second queue after said slave serialization instruction was added to said second queue are excluded from issue.

5. Apparatus as claimed in claim 1, wherein first out-of-order issue circuitry removes said master serialization instruction from said first queue in dependence upon:
   detection by said first out-of-order issue circuitry that there are within said first queue no program instructions added to said first queue before said master serialization instruction was added to said first queue; and
   detection that second out-of-order issue circuitry indicates that there are within said second queue no program instructions added to said second queue before said slave serialization instruction was added to said second queue.

6. Apparatus as claimed in claim 5, wherein said first out-of-order issue circuitry upon removing said master serialization instruction from said first queue triggers said second out-of-order issue circuitry to remove said slave serialization instruction from said second queue.

7. Apparatus as claimed in claim 1, comprising at least one further processing circuitry to manage a further queue of processing operations, wherein said slave generation circuitry generates a further slave processing operation within said further queue in response to adding of said master processing operation to said first queue.

8. Apparatus as claimed in claim 1, wherein
   said first processing circuitry comprises first cache control circuitry and said first queue comprises a queue of cache access requests to a cache memory received from a first source; and
   said second processing circuitry comprises second cache control circuitry and said second queue comprises a queue of cache access requests to said cache memory received from a second source.

9. Apparatus for processing data comprising:
   first processing means for managing a first queue of processing operations;
   second processing means for managing a second queue of processing operations;
   slave generation means for generating a slave processing operation within said second queue in response to adding of a master processing operation to said first queue; and
   dependency control means for controlling at least one of:
      processing of said slave processing operation by said second processing means in dependence upon a master status of said master processing operation; and
      processing of said master processing operation by said first processing means in dependence upon a slave status of said slave processing operation,
   wherein:
   said first processing means includes first out-of-order instruction issue circuitry to manage out-of-order issue of program instructions within a first instruction queue and said second processing means includes second out-of-order instruction issue circuitry to manage out-of-order issue of program instructions within a second instruction queue;
   program instructions are stored into said first out-of-order instruction issue circuitry and said second out-of-order instruction issue circuitry following instruction order within a stream of said program instructions;
   said master processing operation is a master serialization instruction added to said first queue from said stream of program instructions; and
   said first out-of-order issue circuitry is responsive to presence of said master serialization instruction within said first queue to manage said first queue so that program instructions within said first queue added to said first queue after said master serialization instruction was added to said first queue are excluded from issue.

10. A method of processing data comprising the steps of:
managing with first processing circuitry a first queue of processing operations;
managing with second processing circuitry a second queue of processing operations;
generating a slave processing operation within said second queue in response to adding of a master processing operation to said first queue; and
controlling at least one of:
  processing of said slave processing operation by said second processing circuitry in dependence upon a master status of said master processing operation; and
  processing of said master processing operation by said first processing means in dependence upon a slave status of said slave processing operation,
wherein:
said first processing circuitry manages out-of-order issue of program instructions within a first instruction queue and said second processing circuitry manages out-of-order issue of program instructions within a second instruction queue;
program instructions are stored into said first processing circuitry and said second processing circuitry following instruction order within a stream of said program instructions;
said master processing operation is a master serialization instruction added to said first queue from said stream of program instructions; and
said first processing circuitry responds to presence of said master serialization instruction within said first queue to manage said first queue so that program instructions within said first queue added to said first queue after said master serialization instruction was added to said first queue are excluded from issue.

* * * * *